United States Patent [19]

Ramer

[11] 4,209,363
[45] Jun. 24, 1980

[54] SOLAR STILL APPARATUS

[76] Inventor: James L. Ramer, 401 W. Newhall Ave., Waukesha, Wis. 53186

[21] Appl. No.: 878,118

[22] Filed: Feb. 15, 1978

[51] Int. Cl.² .................... C02B 1/04; F24J 3/02
[52] U.S. Cl. ..................... 202/180; 202/172; 202/185 R; 202/234; 202/236; 202/266; 203/10; 203/90; 203/DIG. 1; 203/DIG. 17; 261/154
[58] Field of Search ............. 203/DIG. 1, 10, 11, 203/100, 90, 22, 86, DIG. 17; 202/172, 180, 234, 236, 266, 185 R, 185 B; 261/98, 101, 102, 154

[56] References Cited
U.S. PATENT DOCUMENTS

| 2,141,330 | 12/1938 | Abbot | 202/180 |
|---|---|---|---|
| 2,342,062 | 2/1944 | Schenk | 202/205 |
| 2,490,659 | 12/1949 | Snyder | 203/DIG. 1 |
| 2,803,591 | 8/1957 | Coanda et al. | 202/234 |
| 3,015,613 | 1/1962 | Edmondson | 202/187 |
| 3,088,882 | 5/1963 | Justice | 202/180 |
| 3,104,210 | 9/1963 | Mount | 202/234 |
| 3,192,133 | 6/1965 | Adamec | 202/234 |
| 3,232,846 | 2/1966 | Kimmerle | 202/234 |
| 3,337,418 | 8/1967 | Halacy | 202/83 |
| 3,351,538 | 11/1967 | Andrassy | 202/234 |
| 3,357,898 | 12/1967 | Novakovich | 202/234 |
| 3,359,183 | 12/1967 | Kenk | 202/234 |
| 3,414,481 | 12/1968 | Kelly | 203/10 |
| 3,455,790 | 7/1969 | Marks | 202/185 |
| 3,490,996 | 1/1970 | Kelly | 202/234 |
| 3,820,353 | 6/1974 | Shiraishi et al. | 261/154 |
| 3,870,605 | 3/1975 | Sakamoto | 202/234 |
| 3,875,926 | 4/1975 | Frank | 203/DIG. 1 |

*Primary Examiner*—Wilbur L. Bascomb, Jr.
*Attorney, Agent, or Firm*—Darrell E. Hollis

[57] ABSTRACT

A solar still apparatus having a condensation chamber is disclosed. A plurality of hollow columns are connected to the chamber at the open upper ends of the hollow columns and the lower ends of the hollow columns are adapted to engage a support surface for the still apparatus. The hollow columns also function to contain distilland liquid and to support parabolic solar collectors for heating the liquid to form vapor at the upper end of the hollow columns. The vapor is introduced into the condensation chamber for condensing to form a distillate liquid. Means including a shield and an evaporative surface layer are disclosed to aid the cooling of the condensation chamber relative to the vapor to facilitate the condensation of the vapor in the chamber.

4 Claims, 4 Drawing Figures

SOLAR STILL APPARATUS

The present invention relates to an apparatus for using solar energy, and more particularly to a solar still for purifying brackish or unpotable water.

The prior art related to the present invention contains many structural arrangements of components to form solar still devices. As is well known, such devices have means for providing liquid distilland, solar energy collecting means for heating the distilland to form a vapor, condensing means for condensing the vapor to create a distillate liquid and support means to structurally connect the elements of the device and to support them on a support surface. The present invention involves various novel improvements to the above typical elements of the prior art solar still devices.

The present invention is directed to an improved solar still apparatus for purifying water with a minimum of energy input except for the use of solar energy.

Another object of the present invention is to provide an improved support means for a solar still apparatus.

Still another object is to provide a solar still apparatus with an improved condensing means wherein the cooling and condensing of vapor is facilitated by novel cooling means.

A further object of the present invention is an improved solar still apparatus wherein distilland liquid is used to facilitate the cooling of the vapor condensing means.

Other objects of the present invention are to provide a solar still with an inexpensive and simple construction usable as a portable water purifier for military, construction or municipal purposes.

Other objects and advantages of the present invention will appear to those skilled in the art from the written description which follows.

In accordance with the present invention, I provide an improved solar still apparatus wherein the condensing means has a condensation chamber formed by wall means. In addition, I provide a hollow column means with an upper end connected to the wall means and a lower end for engaging a support surface for the solar still apparatus. The hollow column means functions to contain distilland liquid by virtue of the fact that the lower end of the column means is closed and the upper end of the column means is open and in communication with the interior of the chamber for the condensing means. The hollow column means additionally acts as a mounting for solar energy collecting means so that the supply of distilland liquid within the upper end of the hollow column is vaporized prior to introduction into the condensation chamber. An advantage from the improved construction according to the present invention is that the hollow column means performs three simultaneous functions, namely, they act as a structural support for the solar still apparatus, act as a mounting means for the solar energy collecting means, and act as a distilland liquid containing means.

According to the present invention, I further provide an improved condensing means for the vapor from the hollow column means. According to this aspect of the invention I provide an absorbant evaporative surface layer on the exterior wall of the condenser means. The evaporation of cooling liquid from this surface layer facilitates the cooling of the chamber wall relative to the temperature of the vapor introduced into the chamber from the hollow column means. In accordance with the present invention, the cooling liquid can be distilland liquid. The distilland liquid can be sprayed onto the absorbant evaporative surface layer which is downwardly inclined so that the excess distilland liquid will flow by gravity to the lower portion of the layer. At that point, I provide a receiving means for collecting the excess distilland and for conducting the same to the hollow column means.

According to the improved apparatus of the present invention, I also provide an improved condensing means which has a shield for performing two functions, namely, for shading the absorbant evaporative surface layer from direct solar rays and for directing natural wind currents over the surface layer to facilitate the evaporation of the cooling liquid from the layer.

In accordance with another aspect of the present invention, I provide a solar still apparatus wherein a plurality of hollow column means are utilized to support the solar still apparatus on a support surface. In addition, I provide a plurality of structural support columns to facilitate the support of the apparatus.

According to another aspect of the present invention, the vapor condensing chamber is oriented to have an upper and lower portion, and the upper open end of the hollow column means are connected adjacent the upper portion of the chamber so that, when vapor is introduced at that point and condensed to form a distillate liquid, the liquid will flow downwardly under the force of gravity to the lower portion of the chamber where distillate drain means are provided to receive the distillate liquid.

FIG. 1 is a transverse sectional elevation of an embodiment of the solar still according to the present invention. The sectional view of FIG. 1 is taken along lines 1—1 in FIG. 2.

FIG. 2 is a partial plan view of the solar still apparatus according to one embodiment of the present invention. FIG. 2 depicts the apparatus as would be seen looking down from line 2—2 in FIG. 1. It should be understood that the broken away portion of FIG. 2 would be a mirror image of the illustrated portion.

FIG. 4 represents a section taken along line 4—4 of FIG. 1.

Figure 1:
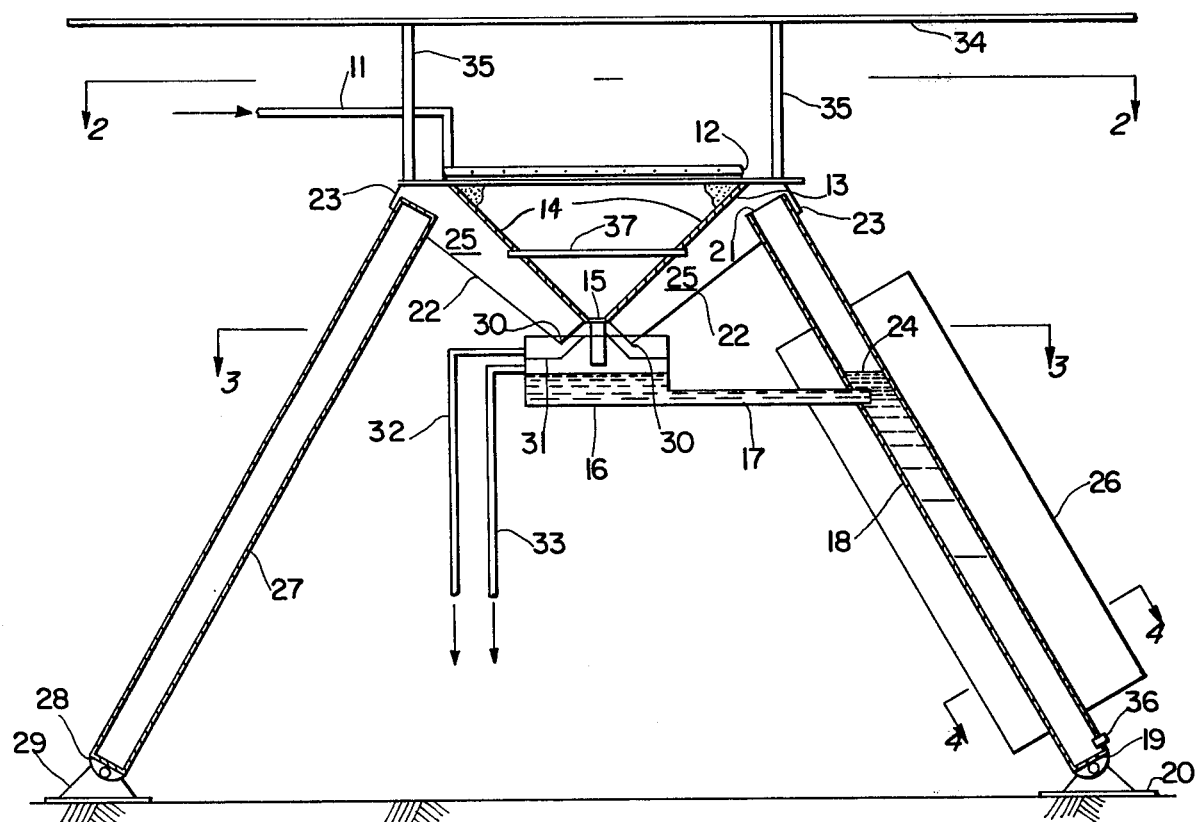
Figure 4:
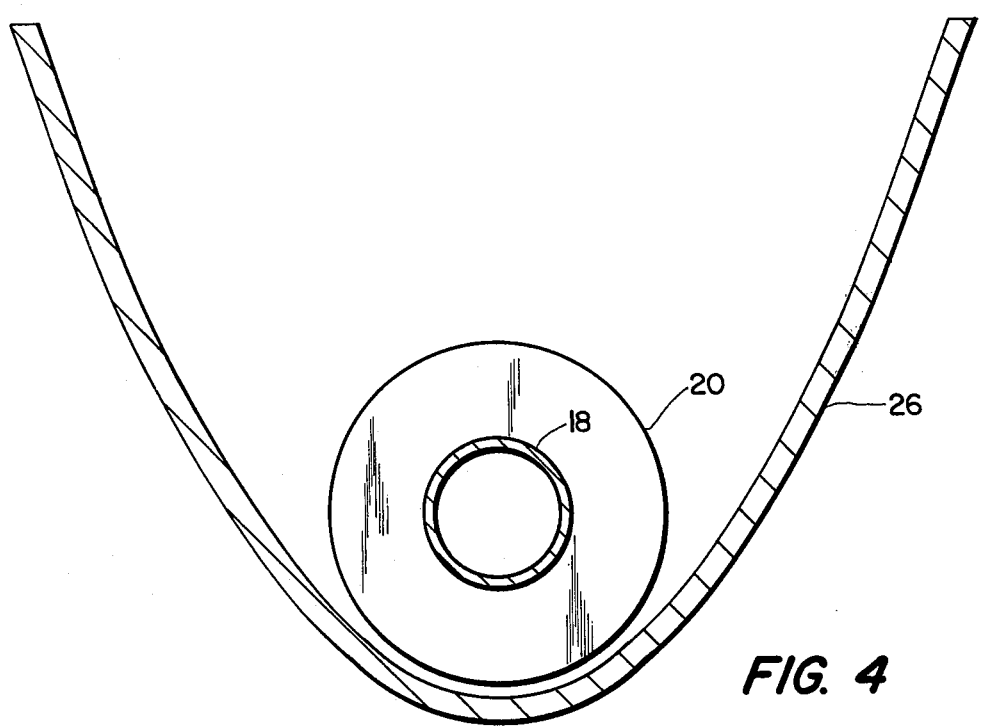
FIG. 4 is an enlarged sectional view of a parabolic solar energy collector according to one embodiment of the present invention.
Figure 2:
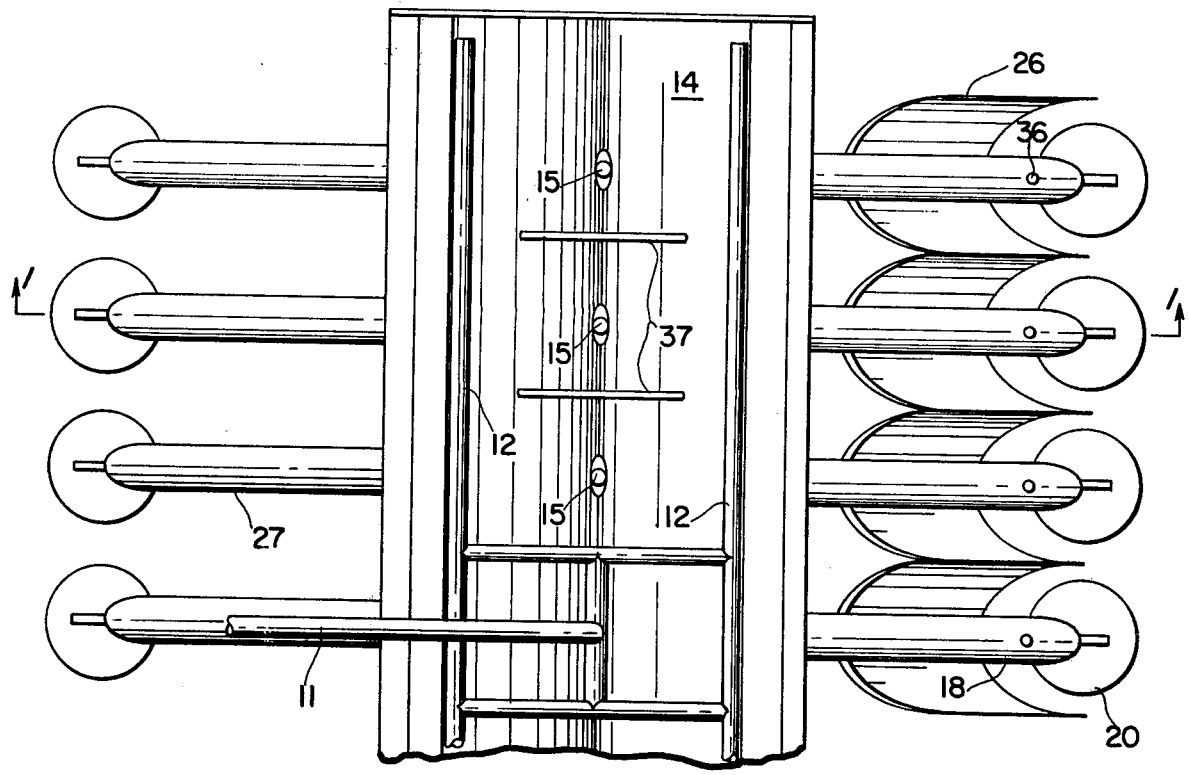
Figure 3:
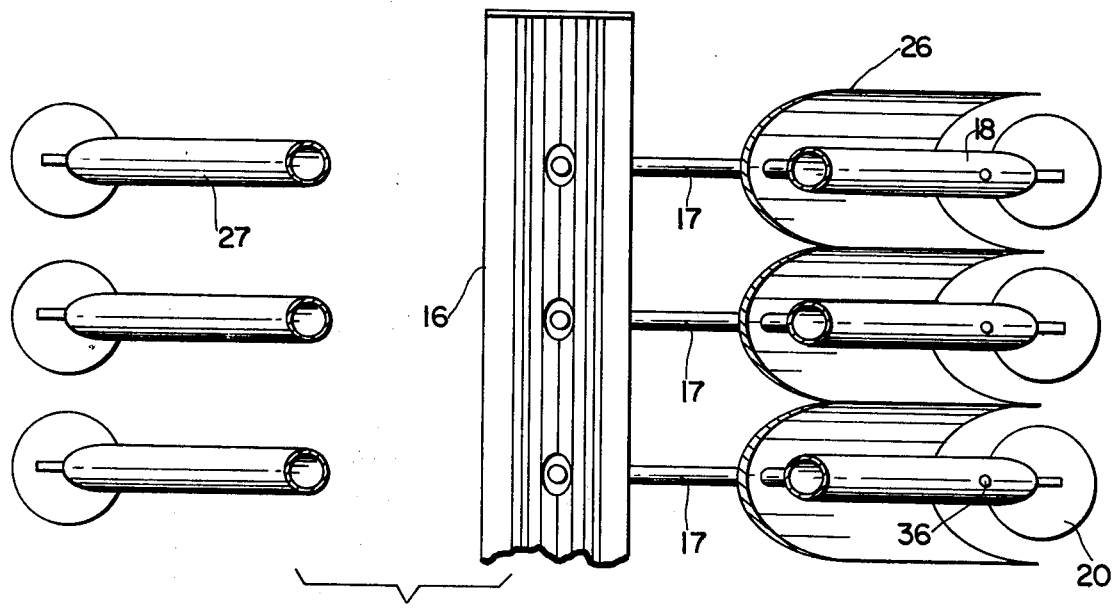
FIG. 3 is a partial plan view taken in section along line 3—3 of FIG. 1. It should be understood that FIG. 3 portrays a portion of an otherwise repetitive arrangement.

For purposes of providing a generalized understanding of the solar still apparatus according to one embodiment of the present invention, I refer to FIGS. 1, 2 and 4. In these figures, like numbers designate the same parts of the apparatus. In this description, I refer to the distilland as brackish water and the distillate as distilled water. It should be understood that this specific distilland and distillate is mentioned merely for the purpose of illustrating one embodiment according to the present invention and that other liquids can be used without departing from the principles described.

Referring to FIGS. 1 and 2, I provide an inlet line 11 for receiving brackish water to be distilled. The inlet line 11 is connected to brackish water spray bars 12 which extend longitudinally above the central portion of the solar still apparatus. Located beneath the spray bars is a trough-shaped wall 13. The upper surface of this wall is covered with an absorbant evaporative surface layer 14 such as an absorbant foam or fabric liner or other suitable material. At the central and lower most portion of the trough-shaped wall means there are provided a plurality of brackish water outlets 15. Positioned beneath the outlets and extending longitudinally of the solar still is a brackish water catch pan 16 as best seen in FIG. 1. Connected to the catch pan are a plurality of brackish water feed lines 17 which direct brackish water outwardly to connect with the interior of a plurality of hollow columns 18. As best seen in FIG. 1, each of the hollow columns have a closed lower end 19 which cooperates with a ground-engaging pad 20 and an upper end 21 being open. The upper end of the hollow columns are connected to wall means which define a condensing chamber. The wall means include wall members 22 extending substantially parallel to the underside of the absorbant coated wall. These walls and members 23 connecting the outer and inner edges of the opposed wall surfaces form longitudinal condensing chambers along the central portion of the apparatus.

When the hollow columns 18 contain sufficient brackish water supplied from the brackish water catch pan 16, vapor is formed at the upper surfaces 24 of the brackish water and this vapor communicates at the upper open ends 21 of the hollow columns into the condensing chamber 25. The vaporization at the upper surfaces 24 of the brackish water supply in the hollow columns 18 is facilitated by the use of solar energy collecting means such as a parabolic reflector 26 shown in section in FIG. 4. It is preferred that each parabolic solar collector is arranged to focus solar energy in a line substantially corresponding to the longitudinal axis of the hollow column 18.

As seen in FIGS. 1 and 2, the wall means forming the condensing chamber 25 is also supported on the upper end of a plurality of support columns 27 which have lower ends 28 engaging ground support pads 29 similar to those provided on the hollow columns 18 on the opposite side of the solar still apparatus. The top of columns 27 are preferably provided with a cap to exclude distillate vapor.

As best seen in FIG. 1, the condensing chamber 25 has upper and lower sections formed by the wall means. At the lower portion of the condensing chamber, outlets 30 are provided for communication with a condensate drip pan 31 which collects distilled water. The distilled water drip pan 31 is, in turn, connected to an outlet line 32 for conducting distilled water out of the solar still apparatus. The brackish water catch pan 16, as best seen in FIG. 1, also has an overflow line 33 connected at a preselected elevation on the side of the catch pan so that the level of brackish water in the catch pan can be controlled. The two sides of chamber 25 may be connected by any convenient means, such as by pipes 37, to allow free passage of vapors from one side to the other.

As best seen in FIG. 1, I provide a sun roof 34 and sun roof supports 35 which support the sun roof above the brackish water spray bar 12. The sun roof 34 is spaced sufficiently above the brackish water spray bar 12 so that natural air currents can flow along the underside of the sun roof and over the absorvent layer 14 within the trough-shaped wall 13 at the center of the device. In the absence of natural air currents, a fan or similar air moving device may optionally be appropriately placed to cause an air flow along the underside of the sun roof.

Having described the novel arrangement of parts comprising an embodiment of the present invention, I will describe the step-by-step flow of brackish water through the solar still whereby it is vaporized, condensed, collected and withdrawn from the device in purified form. Referring to FIG. 1, the starting point for the flow of liquid through the present apparatus is at inlet line 11. The brackish water is pumped through this inlet line 11 to the spray bar 12 which sprays the brackish water downwardly into the central portion of the still. The brackish water impinges upon the absorbent evaporative surface layer 14. The backing for this absorbent layer is impervious to water and therefore the brackish water will be absorbed in the layer. Any excess will flow downwardly over the inclined surfaces of the trough-shaped member to the outlets 15 positioned along the central axis of the device. Thus, it should be apparent, that so long as brackish water spray is being supplied to the absorbent evaporative surface 14, some of the brackish water will be absorbed in the layer, some will be evaporating from the layer and the remainder of the water will be passing downwardly into the brackish water catch pan 16. The function of the evaporating brackish water will be described in more detail at a later point in the specification. The excess brackish water from the catch pan 16 will flow outwardly in lines 17 to supply brackish water to the interior of the hollow columns 18 repetitively arranged on one side of the solar still. The brackish water in the hollow columns 18 is then heated by means of solar energy and the upper surface 24 of the brackish water vaporizes into the upper end of the hollow ends 21 of the hollow columns. As best seen in FIG. 1, this vapor communicates into the condensing chamber 25 adjacent its upper end portion. The vapor introduced at this point impinges upon the inner wall surfaces of the trough-shaped member 13 at the central axis of the device. Furthermore, the vapor impinges upon the inclined inner surface formed by the opposed lower wall portions 22 of the condensing chamber 25. The vapor so introduced condenses upon one or both of the wall portions and the distillate liquid flows downwardly along the inclined surfaces of the condensing chamber to the lowermost point. At that point, the distillate liquid leaves the lower portion of the condensing chamber by way of outlets 30 which are in communication with a distillate drip pan 31.

To facilitate the condensation of the vapor in the condensing chamber 25, the impervious upper wall is cooled relative to the temperature of the water vapor introduced into the condensing chamber. This cooling action takes place due to the evaporation of brackish water from the surface of the evaporative absorbent layer 14. This evaporation action, and its consequent cooling effect on the condensing chamber wall, is facilitated by the sun roof 34 and its placement. The sun roof 34 acts to shield the absorbent layer 14 from direct sunlight so that condensation can take place in the shade. Moreover, the sun roof 34 is spaced above the solar still apparatus a distant sufficient to allow natural wind currents to pass between the lower surface of the sun roof and the wetted surface of the evaporative absorbent layer 14. Thus, the sun roof 34 provides two functions to facilitate the cooling effect due to evaporation from the absorbent layer 14.

To facilitate the heating effect provided for the hollow columns 18 by the parabolic solar collectors 26, the solar still apparatus of the present invention is preferably oriented such that the parabolic reflecting surfaces are approximately normal to the sun. As best seen in FIG. 1, the lower end portion 19 of the hollow columns are provided with openings 36 and plugs which allow for the interior of the columns to be drained and/or cleaned, as desired.

While a preferred embodiment of the present invention has been described in detail and illustrated in the accompanying drawings it is to be understood that the present invention is susceptible of embodiments which differ in detail from the disclosed embodiments and that various refinements and omissions differing from the disclosed embodiments may be adopted without, however, departing from the spirit and scope of the present invention.

I claim:

1. In a solar still apparatus having distilland supply means for providing a supply of liquid distilland, solar energy collecting means for heating said distilland to form a vapor therefrom, condensing means for condensing said vapor to form a distillate liquid, and a plurality of support means to support said apparatus above a surface, the improvement wherein:

said condensing means includes wall means defining a chamber, at least one of said support means includes a hollow column means having a closed lower end adapted to engage said surface and having an upper end connected to said wall means, said upper end being open to provide communication between the interior of said hollow column means and the interior of said chamber, and said solar energy collecting means is mounted on said hollow column means for heating the same whereby distilland liquid within the upper end of said hollow column means is vaporized and said vapor is introduced into said chamber for condensation therein.

2. The invention of claim 1, wherein said distilland supply means includes means to spray said distilland liquid, and said wall means has cooling means mounted thereon, said cooling means including an absorbent evaporative surface layer onto which said distilland liquid is sprayed, and said layer being downwardly inclined so that excess distilland will flow by gravity over said layer to a lower portion thereof, drain means mounted adjacent said lower portion for receiving said excess distilland, and conduit means connected to said drain means and said hollow column means for conducting distilland to said hollow column means, whereby said distilland liquid is used as said cooling liquid and the unevaporated distilland leaving said lower portion provides a supply of distilland for said hollow column means.

3. The invention of claim 2, wherein said condensing means includes shield means for shading said absorbent evaporative surface layer from direct solar rays and for directing natural wind currents over said surface layer, whereby evaporation of said cooling liquid from said layer is facilitated.

4. The invention of claim 1, wherein said chamber has inclined interior wall surfaces defining an upper and lower portion of said chamber, said upper open end of said hollow column means being connected adjacent the upper portion or said chamber so that vapor introduced therein will condense to form distillate liquid which will flow by gravity on said wall surfaces toward said lower portion of the chamber, and means mounted adjacent said lower portion for receiving said distillate.

* * * * *